UNITED STATES PATENT OFFICE.

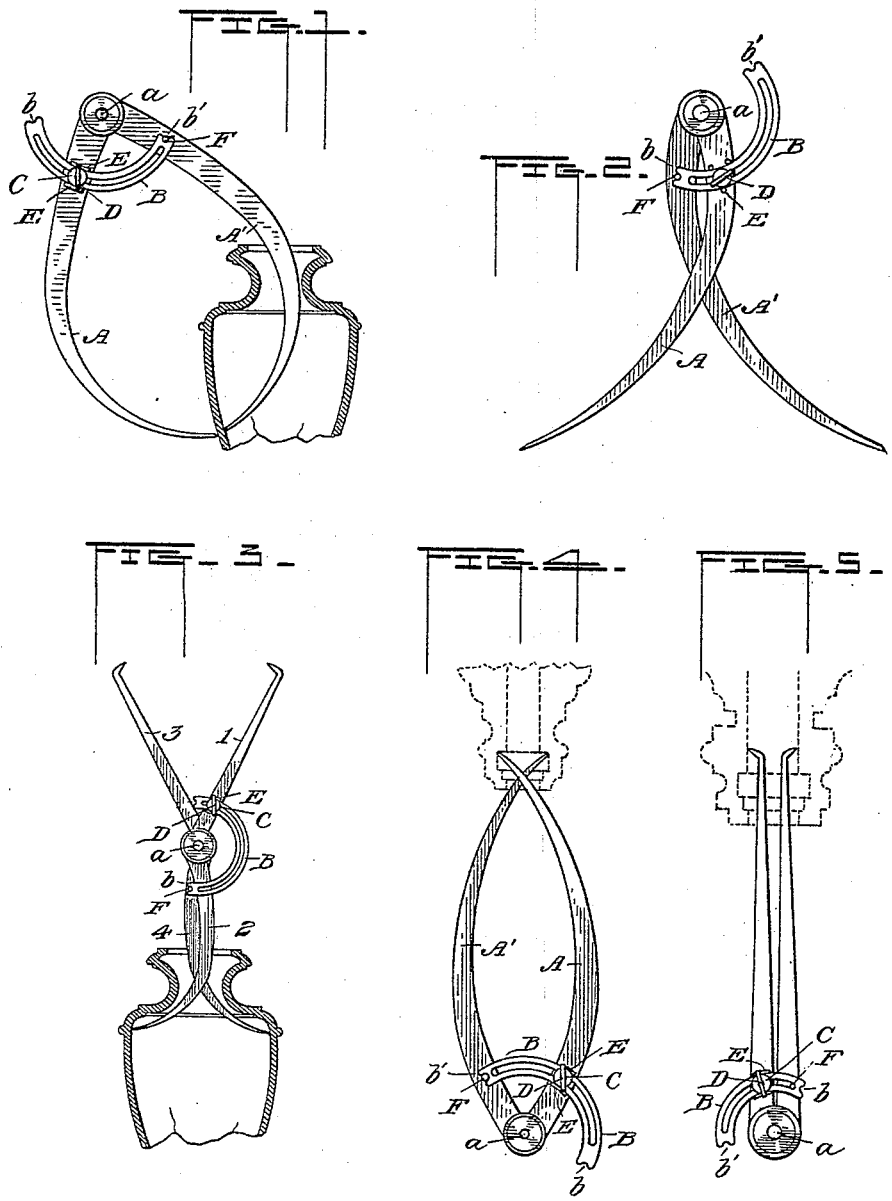

RAIMUND YANDA, OF PITTSBURG, PENNSYLVANIA.

CALIPERS.

SPECIFICATION forming part of Letters Patent No. 447,805, dated March 10, 1891.

Application filed November 24, 1890. Serial No. 372,569. (No model.)

*To all whom it may concern:*

Be it known that I, RAIMUND YANDA, of Pittsburg, in the county of Allegheny and State of Pennsylvania, have invented a new and useful Improvement in Calipers, of which the following is a full, clear, and exact description, reference being had to the accompanying drawings, forming part of this specification, in which—

Figure 1 is a side view of my improved calipers, showing them applied to measuring the thickness of the side of a hollow article, the latter being illustrated in vertical section. Fig. 2 is a side view of the calipers when in position for measuring the internal diameter of a hollow article. Fig. 3 is a view similar to Fig. 1, showing calipers of modified construction. Fig. 4 shows the calipers as used in measuring the internal diameter of a hollow article. Fig. 5 shows calipers of somewhat modified construction.

Like symbols of reference indicate like parts in each of the figures.

My invention is designed to afford an improvement in calipers adapted for the accurate internal as well as the external measurement of articles of any ordinary shape or size.

In Figs. 1, 2, and 3 of the accompanying drawings, A A' represent the curved caliper-arms pivotally united at $a$. B is a curved slotted guide made in the arc of a circle and set between guide-lugs E on the arm A. D is a screw which passes through the slot in the guide B and through a small plate C on the latter into a screw-socket in the arm A. The ends of the guide B are notched, as at $b\ b'$, so that they may engage with a pin F on the arm A', as hereinafter explained.

In Fig. 2 I show the guides E somewhat different from the corresponding parts of Fig. 1, in that instead of the short strips illustrated in Fig. 1, small screws are employed for the same purpose.

Figure 1 shows the calipers in position for taking measurement of the thickness of sides of a hollow article. Fig. 2 shows them in position for taking an inside measurement.

In using the calipers for the purpose illustrated in Fig. 1 the calipers are first opened, one arm is inserted into the vase, the arms are then closed on the vase, the guide B is moved so as to bring the notch $b'$ into engagement with the stud F, and the screw D is turned so as to lock the guide firmly to the arm A. The calipers then may be opened and withdrawn from the vase, and on again closing them, so that the notch $b'$ and stud F shall come into engagement, the exact measurement will be shown and may be noted.

In using the calipers for the purpose illustrated in Fig. 2 the caliper-arms (reversed) are inserted into a hollow article and are spread across each other until their ends come into contact with the sides of the article. The guide B is then adjusted so that its end shall come into contact with the stud F and is locked. The calipers are then withdrawn, and on again bringing the arms into proper position to engage the stud the proper measurement will be shown. In Fig. 4 I show the calipers used in a similar way, but without reversal of the arms.

Fig. 5 shows a modified form of calipers, in which the stop F is inside the slot of the guide B. This form of calipers is adapted for measuring internal diameters of small hollow articles.

In Fig. 3 I show compound calipers having four arms, of which the arms 1 and 2 are fixed together and the arms 3 and 4 fixed together. The curved guide is adjustably fixed to the arm 1, and its end is adapted to engage the arm 4 and to lock both it and the arm 3. The instrument shown in this figure is in effect two calipers—one for external and the other for internal measurement—and the curved guide B serves for both.

The drawings as above described are sufficient to illustrate the manner of use of my invention and its varied application to calipers of different forms, the advantage of which will be apparent to mechanics having occasion to use calipers.

I claim—

1. In calipers, the combination, with the pivotally-connected arms, of a slotted curved guide-piece B, a set-screw adjustably connecting it with one arm and a stop on the other arm, with which said guide is adapted to engage, substantially as and for the purposes described.

2. In calipers, the combination, with the pivotally-connected arms, of a slotted curved guide-piece B, a set-screw adjustably connecting it with one arm, a stop on the other arm, with which said guide is adapted to engage, and a guide E, substantially as and for the purposes described.

In testimony whereof I have hereunto set my hand this 7th day of June, A. D. 1890.

RAIMUND YANDA.

Witnesses:
W. B. CORWIN,
H. M. CORWIN.